United States Patent [19]

Sebrell

[11] 3,957,232
[45] May 18, 1976

[54] INFLATABLE WING

[75] Inventor: Wayne A. Sebrell, Albuquerque, N. Mex.

[73] Assignee: The United States of America as represented by the United States Energy Research and Development Administration, Washington, D.C.

[22] Filed: Feb. 3, 1975

[21] Appl. No.: 546,474

[52] U.S. Cl................................ 244/123; 244/44; 416/84
[51] Int. Cl.².......................................... B64C 3/30
[58] Field of Search .......... 244/123, 43, 44, DIG. 2, 244/107; 416/84, 142, 232, 240; 52/2

[56] References Cited
UNITED STATES PATENTS

| 511,472 | 12/1893 | Sumouski | 52/2 |
|---|---|---|---|
| 2,131,528 | 9/1938 | Sayer | 52/2 |
| 2,540,482 | 2/1951 | Hervey | 244/123 |
| 2,616,509 | 11/1952 | Thomas | 416/142 |
| 2,711,868 | 6/1955 | Parker et al. | 244/107 |
| 2,854,014 | 9/1958 | Hasselquist | 52/2 |
| 3,184,187 | 5/1965 | Isaac | 244/43 |
| 3,393,479 | 7/1968 | Slotnick | 52/2 |
| 3,743,440 | 7/1973 | Moore | 416/84 |
| 3,779,487 | 12/1973 | Ashton | 244/123 |

FOREIGN PATENTS OR APPLICATIONS

| 2,225,784 | 12/1972 | Germany | 52/2 |
|---|---|---|---|

Primary Examiner—Trygve M. Blix
Assistant Examiner—Galen L. Barefoot
Attorney, Agent, or Firm—Howard J. Osborn; Wallace J. Nelson; John R. Manning

[57] ABSTRACT

An inflatable structure for use as an aerodynamic surface. The structure is formed from a series of cylindrical pressure chambers which are inflated to deploy the structure from its stored condition. Varying cylinder sizes yield aerodynamically curved surfaces.

12 Claims, 3 Drawing Figures

INFLATABLE WING

ORIGIN OF THE INVENTION

The invention described herein was made in the performance of work an AEC contract and is subject to the provisions of Section 152 of the Atomic Energy Act of 1954 (42 USC 2182).

BACKGROUND OF THE INVENTION

This invention relates generally to inflatable structures and more specifically to such structures used for aerodynamic surfaces. Inflatable aerodynamic surfaces have been used previously, but such structures are quite different in construction from the inflatable wing of the present invention. Previous devices involve the use of two panels of treated cloth one of which forms the upper surface of the wing and the other of which forms the lower wing surface. These air tight surfaces are joined together at the edges with a pressure tight seal so that the edges form the leading edge, trailing edge, and wing tip. Surface shape is maintained by joining the upper and lower surface with multitude of threads of varying length. These threads, which number approximately 100 to the inch are run in rows and permit the surfaces to separate only to the length of the threads. The threads function only to keep the fabric spaced at the predetermined distance and do not compartmentalize the volume in any manner. The entire wing volume is one air container and a leak in any portion of the surface will deflate the entire structure.

SUMMARY OF THE INVENTION

The present invention uses a compartmentalized structure to increase the structural strength and to minimize the danger of loss of air pressure.

The wing structure is constructed of a series of circular cross section cylindrical chambers whose axial length runs essentially traverse to the airstream direction. Each inflatable structure is composed of a number of these cylinders butted and bonded together at their tangents which give the structure its basic shape when inflated. Flexible membranes are used to cover the ridges formed by the abutting cylinders and are bonded to the tangents of the cylinders to form aerodynamically smooth surfaces on the tip and bottom of the wing. The cylinders may be inflated from common or independent manifolds, but simplicity suggests the use of the common manifold. Simple check valves on each individual cylinder are then used to prevent a leak in one cylinder from deflating the whole structure. Since inflatable structures tend to inflate to a membrane or circular geometry, the basic geometry of the cylinders matches the membrane state of stress and yields a stronger structure which is less subject to distortion from external forces. Moreover, because of the initial tube shape, the cylinder structure is exceptionally stable with variations in pressure beyond the initial pressurization required for inflation. This is a particular advantage for aerodynamic surfaces where shape is critical since variations in airspeed and altitude change the effective pressure differential to which such structures are subjected. The present invention, therefore, makes available a superior inflatable aerodynamic structure with higher structural strength, greater stability and less danger of deflation.

DETAILED DESCRIPTION OF THE INVENTION

Figure 1:
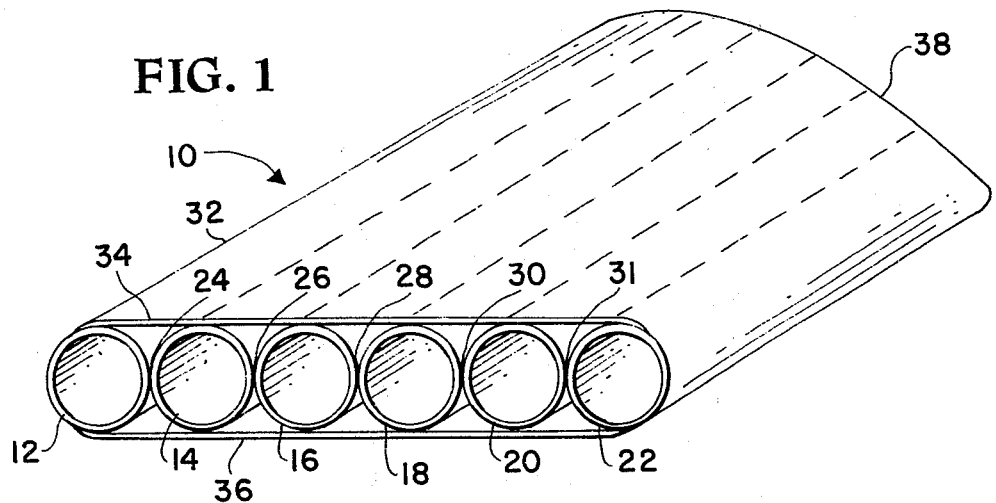
FIG. 1 is a sectional perspective view of the structure of the invention.

The basic structure of the invention is shown in FIG. 1. Inflatable wing 10 is constructed of air tight fabric cylinders 12, 14, 16, 18, and 22 of the same cross sectional size whose axis are all parallel. In this embodiment, the cylinders are oriented so that their lines of tangency 24, 26, 28, 30, and 32, at which they abut and are bonded for essentially their entire length, all fall in a single plane. This configuration yields a basic flat wing surface when upper cover 34 which is bonded to the uppermost tangent lines of the cylinder and lower cover 36 which is bonded to the lower tangent lines of the cylinders are stretched taut by the inflation of the air tight cylinders. Inflatable wing 10 is made to terminate at edge 38 in a section which is not perpendicular to the axis of the cylinder by varying the length of each cylinder and sealing the cylinders at edge 38. As shown in FIG. 1 the cylinder lengths are made progressively longer between cylinder 12, the shortest length, and cylinder 22, the longest.

Figure 2:
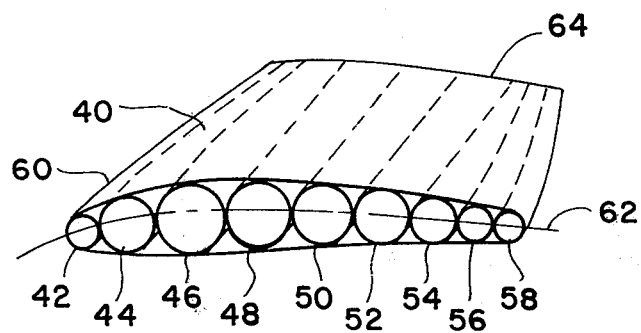
FIG. 2 is a sectional perspective view of an alternate embodiment of the invention.

FIG. 2 depicts the configuration of the invention which results in a curved aerodynamic surface. For such a configuration enclosures 42, 44, 46, 48, 50, 52, 54, 56, and 58 progressively vary in cross sectional diameter. Furthermore, the abutting tangency lines of these cylinders are varied to adjust the shapes of upper wing surface 40 and lower wing surface 60. The locus 62 of the tangency lines of the cylinders 42 through 58 is a curved surface rather than a flat plane. The lengths of cylinders 42 through 58 are all equal resulting in an end section 64 of the surface which is perpendicular to the axis of the cylinders. The diameters of enclosures 42, 44, 46, 54, 56, and 58 are also shown to decrease as the axial distance increases. This taper of the essentially conical configuration results in a decrease in the width of the aerodynamic surface as the length increases. FIG. 2 thus shows a practical configuration for a typical airfoil. It is to be understood that this shape of enclosure can also be used in an arrangement where all of the enclosures are tapered.

Figure 3:
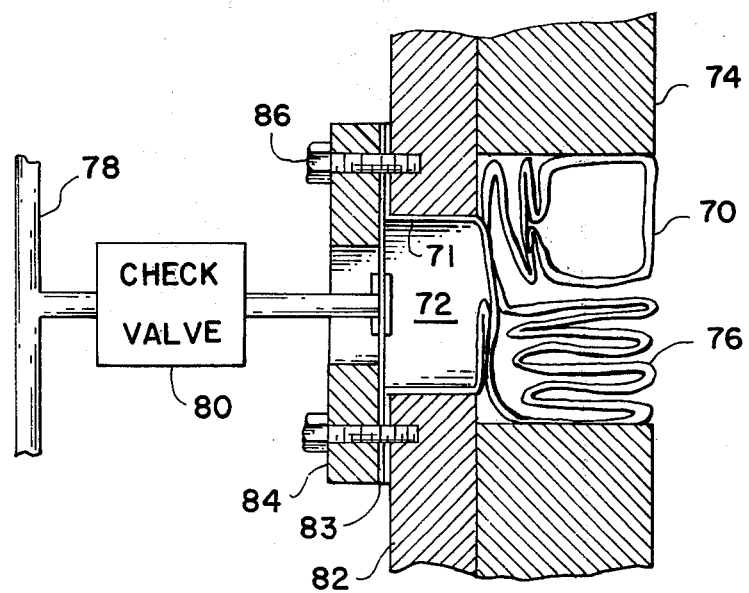
FIG. 3 is a cross section view of the deflated wing folded for storage.

FIG. 3 depicts an end view of the wing in cross section in which a single cylinder 70 of the inflatable wing can be seen compressed into a storage compartment 72 of a vehicle body 74. For such an arrangement, cylinder 70 is deflated and placed into compartment 72 in folds 76, being held in place by bonding at surface 71. For deployment of the inflatable wing, air pressure is applied through common manifold 78 to all cylinders of a wing. This causes air flow through check valve 80 which permits air flow only in the direction from common manifold 78 toward cylinder 70. Since no air will flow in the opposite direction through check valve 80, cylinder 70, once inflated, cannot be deflated by a single leak in one of the other cylinders. Also, as shown in FIG. 3, cylinder 70 may be held in place in compartment 72 by being clamped into space 83 between surface 82 and holding block 84, by clamping screw 86.

It is also to be understood that the forms of the invention herein shown are merely preferred embodiments.

Various changes may be made in shape, size, or arrangement of parts; equivalent means may be substituted for those illustrated and described; and certain features may be used independently from other features without departing from the spirit and scope of the invention. For example, cylinder cross section may be varied while keeping the tangency points in a single plane to yield identical curves on both the upper and lower surface of the wing. Moreover, the check valve may be omitted from FIG. 3 if little likelihood of accidental deflation exists.

What is claimed as new and desired to be secured by Letters Patent of the United States is:

1. An inflatable aerodynamic wing structure comprising:
    an airfoil having at least two airtight inflatable tubular enclosure means made of a flexible material and extending in a spanwise direction, said enclosure means are butted lengthwise together and bonded together at their lines of contact for essentially the entire length of the enclosures providing an inner inflatable support structure and airfoil definition to the airfoil;
    outer collapsible cover means forming a taut, smooth airfoil outer surface about the entire enclosure means when the enclosure means are inflated, and bonded along the lines of contact between the cover means and the enclosure means;
    inflation means for inflating the enclosure means to form the inflatable structure.

2. An inflatable airfoil as in claim 1 wherein said tubular enclosure means are cylinders, varying in cross section from one to the other and thereby defining the contour of the cross section of the airfoil, the cylinders progressively increasing the diameter from the airfoil leading edge to an intermediate maximum diameter then progressively decreasing in diameter to a relatively thin trailing edge.

3. An inflatable structure for use as an aerodynamic structure as in claim 1 wherein said enclosure means are butted together so that all their axes are in a single plane.

4. An inflatable structure for use as an aerodynamic structure as in claim 1 wherein said enclosure means are butted together so that the locus of their tangent lines is a smooth curved surface.

5. An inflatable structure for use as an aerodynamic structure as in claim 1 wherein said enclosure means have axes of unequal length thereby forming a terminating edge of the structure which is not perpendicular to the axes of the enclosure means.

6. An inflatable structure for use as an aerodynamic structure as in claim 1 wherein at least some of the enclosure means are of conical shape decreasing in diameter with axial length.

7. An inflatable structure for use as an aerodynamic structure as in claim 1 wherein the inflatable means includes a manifold common to all enclosure means in the inflatable structure.

8. An inflatable structure for use as an aerodynamic structure as in claim 1 wherein the inflation means includes an isolation means which prevents the deflation of all enclosures means when one enclosure means is punctured.

9. An inflatable structure for use as an aerodynamic structure as in claim 8 wherein the isolation means is a check valve associated with each enclosure which permits airflow only in the direction to cause inflation.

10. An inflatable structure for use as an aerodynamic structure as in claim 1 further comprising a retention means to hold one end of the enclosure means within a storage compartment when the enclosure means is inflated.

11. An inflatable structure for use as an aerodynamic structure as in claim 10 wherein the retention means is a bond between the base of the enclosure means and the walls of the storage compartment.

12. An inflatable structure for use as an aerodynamic structure as in claim 10 wherein the retention means is a clamping means for the end of the enclosure means within the storage compartment.

* * * * *